Figure 1:
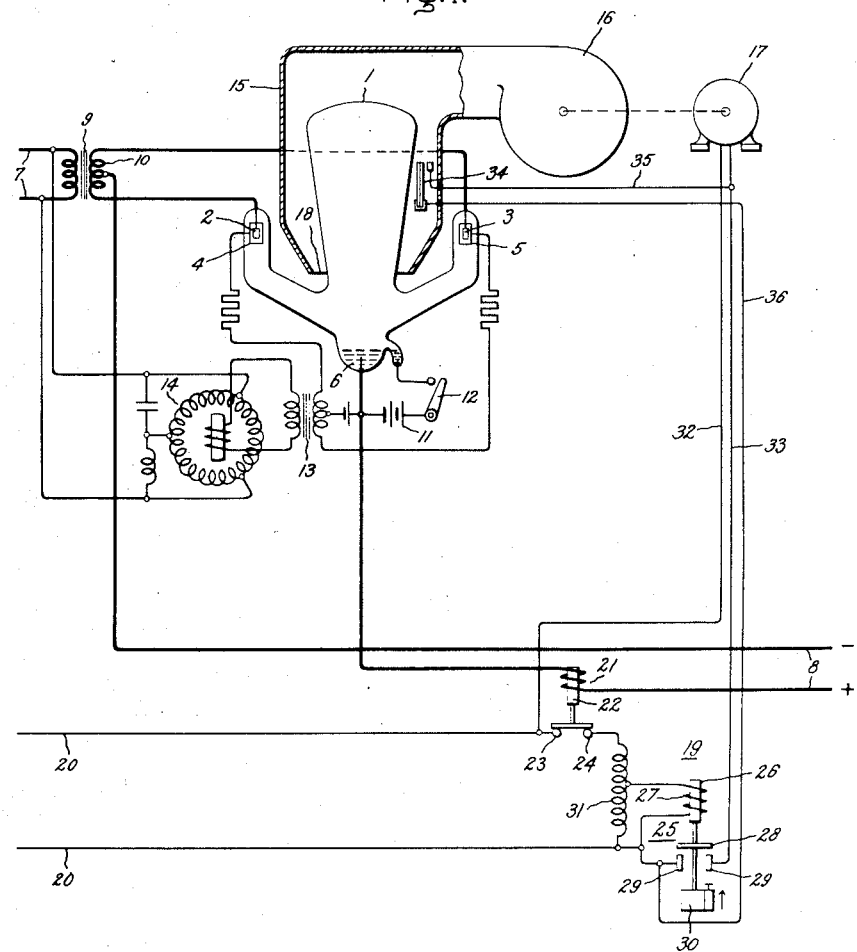

Patented Apr. 2, 1940

2,196,022

UNITED STATES PATENT OFFICE 2,196,022

TEMPERATURE CONTROLLING SYSTEM FOR ELECTRICAL APPARATUS

Elmo E. Moyer, Scotia, N. Y., assignor to General Electric Company, a corporation of New York Application November 27, 1936, Serial No. 112,905

3 Claims. (Cl. 250—27)

My invention relates to control systems for electrical apparatus and more particularly to temperature controlling systems for electron discharge devices.

Heretofore there have been devised numerous arrangements for controlling the temperature of electrical apparatus. Many of these prior art arrangements have operated to cool the electrical apparatus by circulating a cooling medium, such as air, about the apparatus. In some instances the cooling medium has been circulated continuously about the apparatus, and in other of the prior art arrangements the cooling medium has been controlled and circulated in accordance with the temperature of the apparatus. These prior art cooling systems have not been entirely satisfactory where the electrical apparatus is employed in a system where the energy transmitted varies within wide limits and where it is desirable to anticipate a rise in temperature of the apparatus so that the cooling system may be placed in operation prior to a rise in temperature. For example, in circuits including electron discharge devices, such as electric valve means employing ionizable mediums, it is frequently desirable to anticipate a rise in temperature of the electric valve means so that the cooling system may be started prior to the actual rise in temperature.

It is an object of my invention to provide a new and improved cooling system for electrical apparatus.

It is another object of my invention to provide a new and improved temperature controlling system for electron discharge devices.

It is a further object of my invention to provide a new and improved cooling system for electric valve means of the type employing ionizable mediums such as gases or vapors.

In accordance with an illustrated embodiment of my invention, I provide a cooling system for controlling the temperature of electric valve means wherein the cooling system is initiated in its operation to anticipate a rise in temperature of the device in accordance with an electrical condition of the electric valve means, or in accordance with an electrical condition of an associated circuit. Additional means, such as temperature responsive means, are also associated with the electric valve means to maintain the cooling system in operation so long as the temperature of the electric valve means exceeds a predetermined value. The cooling system comprises a motor driven fan for circulating air around the envelope of the electric valve means, and a control circuit for controlling the energization of the motor so that the system is initiated in its operation when the load current exceeds a predetermined value and maintained in operation for a predetermined interval after the load current has attained a predetermined value.

In accordance with another illustrated embodiment of my invention, I provide a cooling system for electrical apparatus in which the electrical apparatus or an associated circuit or circuits are controlled in the event the cooling system fails to function in a predetermined manner. More specifically, I provide a system for circulating a cooling fluid about electrical apparatus and which reduces the load imposed upon the electrical apparatus in the event the cooling system fails to respond by supplying a sufficient amount of cooling fluid to the electric valve means within a predetermined time after the initiation of the cooling operation.

Figure 2:
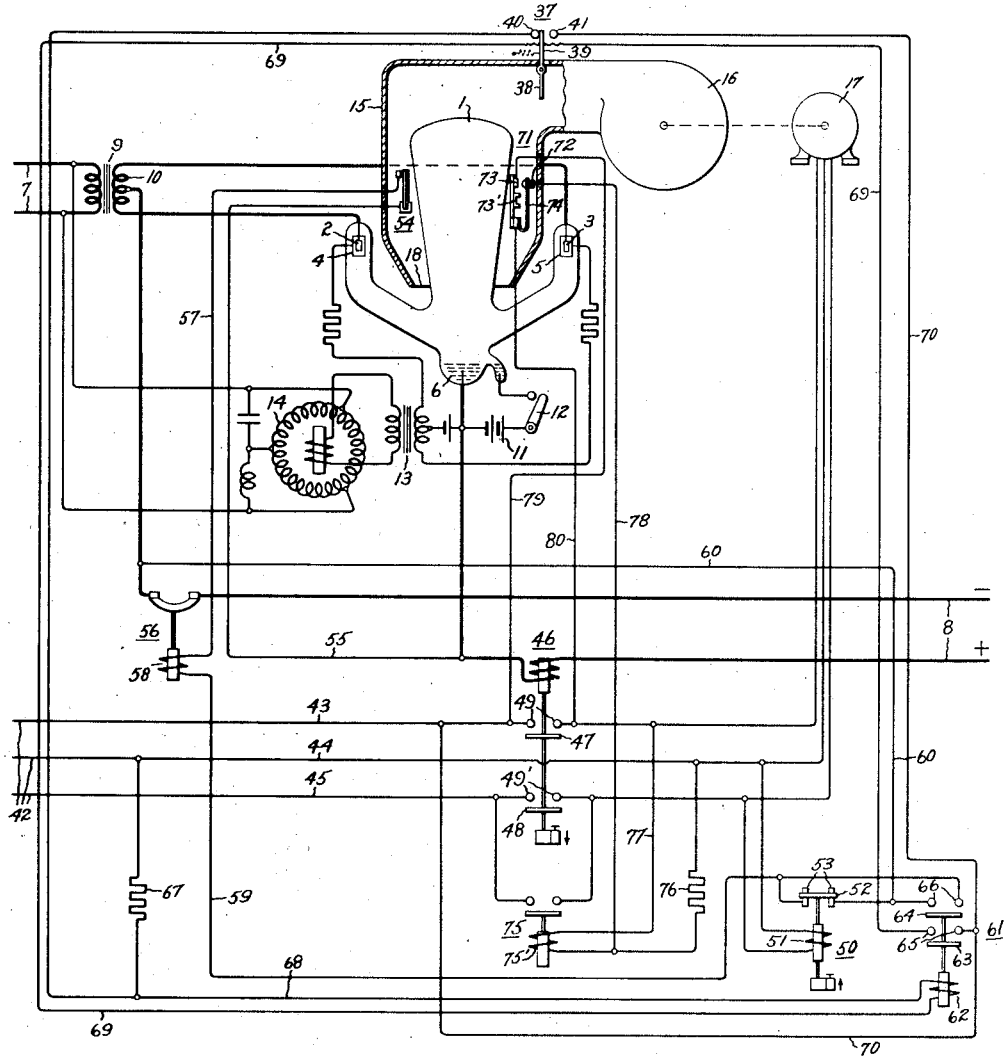

For a better understanding of my invention, reference may be had to the following description taken in connection with the accompanying drawings, and its scope will be pointed out in the appended claims. Figs. 1 and 2 of the accompanying drawings diagrammatically show embodiments of my invention as applied to an electric valve means for transmitting energy between an alternating current circuit and a direct current circuit.

Referring to Fig. 1 of the accompanying drawings, I have chosen to show my invention as applied to a cooling system for controlling the temperature of electrical apparatus arranged for transmitting energy between an alternating current circuit and a direct current circuit. An electric valve means 1, preferably of the type employing an ionizable medium such as a gas or a vapor and having anodes 2 and 3, control members 4 and 5 and a cathode 6, is interposed between an alternating current circuit 7 and a direct current circuit 8 to transmit energy therebetween. A transformer 9 is interposed between the alternating current circuit 7 and the electric valve means 1, and the terminals of a secondary winding 10 thereof are connected to anodes 2 and 3 of electric valve means 1. Any suitable starting arrangement, such as a battery 11 and a switch 12, may be associated with the mercury pool cathode 6 of electric valve means 1 to start the electric valve means 1. Control members 4 and 5 may be energized from the alternating current circuit 7 through a conventional excitation circuit including a transformer 13 and any conventional phase shifting arrangement such as the rotary phase shifter 14.

In order to control the temperature of the electric valve means 1, I provide a cooling system for circulating a cooling medium or fluid, such as air, about the envelope of the electric valve means 1. This cooling system may comprise a compartment or housing 15, which is shown in partial cross-section and which substantially surrounds the envelope of the electric valve means 1 and includes a fan 16. The fan 16 may be driven by a suitable electric motor 17 which is directly connected to the fan 16. The fan 16 draws air through an intake opening (not shown) and forces it through the compartment 15 around the envelope of the electric valve means 1 and expels the air through the opening 18 at the bottom of the compartment 15. Although for the purpose of explaining my invention I have chosen to represent the cooling system as comprising a motor driven fan of the structure diagrammatically shown, it should be understood that my invention in its broader aspects may be applied to cooling systems generally wherein other structures and other cooling mediums and actuating elements are employed.

To control the energization of the electric motor 17 in accordance with an electrical condition of one of the associated circuits, such as the current transmitted by the electric valve means 1 or the current of the load circuit 8, I provide a control circuit 19 comprising a source of alternating current 20 and a current responsive device, such as a relay 21, which is connected to be controlled in accordance with the current in the direct current load circuit 8. The alternating current circuit 20 may be connected to the alternating current circuit 7 and in the particular arrangement shown is utilized as the source of energy for the electric motor 17. The current responsive relay 21 is designed to raise an armature member 22 without appreciable time lag and to open contacts 23 and 24 when the current of direct current load circuit 8 increases to a predetermined value. The control circuit 19 also includes a time delay relay or control device 25 having an armature member 26, an actuating coil 27, a movable contact member 28 and stationary contacts 29. The time delay relay 25 is designed to close the contacts 29 through the movable contact 28 without substantial time lag after the actuating coil 27 has been deenergized, and it is also designed to open the contacts 29 with a predetermined time delay established by a suitable means, such as a dashpot 30, or a self-synchronous motor, which in the particular embodiment diagrammatically shown is attached to the armature 26. The actuating coil of the time delay device 25 is energized from the alternating current circuit 20 through an auto-transformer 31 which is employed to impress on the actuating winding 27 a suitable voltage for which it may be designed. When the contacts of the time delay device 25 are in the closed circuit position, the electric motor 17 is connected to be energized from the alternating current circuit 20 through conductors 32 and 33.

In order to assure that the cooling system is maintained in operation so long as the temperature of the electric valve means 1 exceeds a predetermined value, I employ a suitable temperature responsive device, such as a bimetallic thermostatic relay 34, which may be situated within the compartment 15 and adjacent to or in the proximity of the envelope of the electric valve means 1 to maintain the electric motor 17 energized irrespective of the position of the time delay relay 25. The thermostatic relay 34 is connected through conductors 35 and 36 to energize the electric motor 17 from the alternating current circuit 20 when a predetermined temperature of electric valve means is exceeded.

The operation of the embodiment of my invention diagrammatically shown in Fig. 1 of the accompanying drawings will be described when the electric valve means 1 is operating as a rectifier to transmit energy from the alternating current circuit 7 to the direct current load circuit 8. Let it be assumed that the rotary phase shifter 14 is adjusted so that suitable potentials are impressed on the control members 4 and 5 of electric valve means 1, in order that the electric valve means 1 impresses on the direct current circuit 8 a voltage of a suitable magnitude. If the nature of the load circuit connected to the circuit 8 is such that the current experiences intermittent increases in value, it is desirable to initiate the operation of the cooling system to maintain the temperature of the electric valve means 1 within certain predetermined limits. When the current in the direct current circuit 8 increases to the value for which the current responsive device 21 has been adjusted, the armature member 22 will be raised to effect deenergization of the auto-transformer 31, effecting thereby deenergization of the actuating winding 27 of the time delay device 25. As a result thereof, the armature member 26 will drop immediately, causing the movable contact 28 to bridge the stationary contacts 29. Motor 17 will be energized through a circuit including circuit 20, stationary contacts 29 and movable contact 28 of the time delay device 25 and conductors 33 and 32.

So long as the current in the direct current circuit 8 exceeds the predetermined value for which the relay 21 is adjusted, the armature 22 thereof will be raised to open contacts 23 and 24. Under these conditions, the actuating coil 27 of the time delay relay 25 will be deenergized so that the motor 17 will be energized so long as the current in the direct current circuit 8 exceeds the predetermined value. When the current in the direct current circuit 8 decreases to a value less than the predetermined value, armature 22 of the relay 21 will drop to close contacts 23 and 24 to initiate a timing operation, interval of which is established by the time delay device 25. During this interval the motor will be energized to maintain the cooling system in operation a predetermined time after the load current has decreased below the predetermined value. In this manner the system operates to cool the electric valve means 1 after the heavy load period of operation.

It is to be understood that the control circuit 19 will initiate operation of the cooling system to anticipate a rise in temperature of the electric valve means 1 in accordance with an increase in current in the circuit 8, so that the cooling system is maintained in operation for the duration of the large current condition and for a predetermined time after the current in the circuit 8 has decreased to a value less than the predetermined value. So long as the load current remains below this value, the cooling system is not placed in operation. In the event the temperature of the electric valve means 1 exceeds a predetermined value established by the setting of the thermostatic relay 34, the relay 34 will effect energization of the electric motor 17 from the alternating current circuit 20 so that the electric valve means 1 is cooled irrespective of the operation of the control circuit 19. When the thermostatic relay 34 moves to the closed circuit position, it will be noted that the electric motor 17 is energized from the alternating current circuit 20 through conductors 32, 35 and 36. In this way, the thermostatic relay renders ineffective the control circuit 19 when the temperature of the electric valve means 1 exceeds a predetermined value.

Another embodiment of my invention is diagrammatically shown by Fig. 2. The electric translating system of Fig. 2 is substantially the same as that of Fig. 1 and corresponding elements have been assigned like reference numerals. As a means for controlling one of the associated circuits, for example the load circuit 8, in accordance with the operation of the cooling system, I have provided a pressure responsive device 37 which operates in accordance with the pressure of the air supplied by the fan 16. The pressure responsive device 37 includes a vane 38 which is placed within the housing or duct 15 and includes a movable contact member 39 and stationary contacts 40 and 41. The movable contact member 39 is spring biased to engage the stationary contact 40 when the pressure of the air does not attain a predetermined value. When the pressure of the air attains or exceeds a predetermined value, the movable contact member 39 is brought into engagement with the stationary contact 41.

A three phase alternating current circuit 42 is provided to energize the alternating current motor 17 and includes phase conductors 43, 44 and 45. As a means for initiating the operation of the cooling system by the energization of the motor 17 in accordance with an electrical condition of the electric valve means 1 or one of the associated circuits, such as the current of the direct current circuit 8, I employ a current responsive relay 46 having movable contacts 47 and 48 and stationary contacts 49 and 49'. The current responsive relay 46 is of the type arranged to close substantially coincidentally with the occurrence of a predetermined current in the direct current circuit 8 and to remain closed so long as that electrical condition continues. Due to the time delay feature of the current responsive device 46, this relay effects energization of the motor 17 for a predetermined interval of time after the occurrence of the electrical condition. It will be noted that the phase conductor 44 of the alternating current circuit 42 is permanently connected to one terminal of the alternating current motor 17 and that the control of the motor 17 is effected by controlling the connection of phase conductors 43 and 45 to the other two terminals of the alternating current motor 17. As a means for providing a timing interval prior to the time the pressure responsive device 37 is made effective, I employ a suitable timing device, such as a relay 50, having an actuating coil 51 connected to be energized from one phase of the alternating current circuit 42 and having a movable contact member 52 and stationary contacts 53. Relay 50 is designed so that the movable contact member 52 disengages stationary contacts 53 a predetermined interval of time after the closing of the current responsive device 46.

A normally closed thermostatic relay 54 is associated with the electric valve means 1 and is connected to the cathode 6 of electric valve means 1 through a conductor 55 and is connected to a circuit controlling means 56 through a conductor 57. A circuit controlling means 56 is provided with an actuating coil 58 which normally maintains this element in the closed circuit position. The actuating coil 58 is connected through a conductor 59 to the operating contacts 52 and 53 of the time delay relay 50 and the operating contacts of the time delay relay 50 are connected to the secondary winding 10 of transformer 9 through a conductor 60. A relay 61 is employed to assure the continuous energization of the actuating coil 58 of the circuit controlling means 56 after the pressure of the air of the cooling system attains a predetermined value. The relay 61 is provided with an actuating coil 62, movable contact members 63 and 64, and stationary contacts 65 and 66. The actuating coil 62 is connected to be energized in accordance with the voltage appearing between phase conductors 43 and 44 through the pressure responsive device 37 when the movable contact member 39 is in the right-hand position and when this member engages the stationary contact 41. This circuit includes a resistance 67, conductor 68, actuating coil 62, a conductor 69, which is connected to the movable contact member 39 of the pressure responsive device 37, stationary contacts 65 and movable contact member 63, and a conductor 70. The contacts 65 and 63 of the relay 61 serve to assure the energization of the actuating coil 62 after the movable contact member 39 of the pressure responsive device 37 has been moved to the right-hand position and has initiated the actuation of relay 61. Stationary contacts 66 and movable contact member 64 of relay 61 provide a shunt path around the contacts of the time delay relay 50 so that the energization of the actuating coil 58 of the circuit controlling means 56 is assured after the pressure of the cooling air attains a predetermined value.

To provide a means for maintaining the cooling system in operation after the current responsive device 46 moves to the open circuit position in the event the temperature of the electric valve means 1 exceeds a predetermined value, I employ any suitable arrangement such as a thermostatic relay 71 of the snap acting type having stationary contacts 72 and 73, a permanent magnet 73', and a bi-metallic movable contact member 74. The movable contact member 74 is arranged to engage stationary contact 72 so long as the temperature of the electric valve means 1 remains below a predetermined value. When the temperature of the electric valve means exceeds this value, the movable contact member 74 rapidly moves to engage the stationary contact 73. A contactor 75 includes an actuating coil 75' which is energized in accordance with the voltage appearing across one phase of the alternating current circuit 42 and is controlled by the thermostatic relay 71. When the movable contact member 74 of relay 71 engages the stationary contact 72 the actuating coil 75' of the contactor 75 is short circuited. However, when the movable contact member 74 engages the stationary contact 73, the actuating coil 75' of the contactor 75 is energized in accordance with the voltage appearing between phase conductors 43 and 44 of alternating current circuit 42 through a circuit including a resistance 76 and a conductor 77. A conductor 78 is connected between stationary contact 72 and the common juncture of the resistance 76 and the actuating coil 75' of contactor 75. The thermostatic relay 71 serves to complete a shunt path around contacts 49 of the current responsive device 46 when the temperature of the electric valve means 1 exceeds a predetermined value. This shunt path includes a conductor 79 which is connected between stationary contacts 73 of thermostatic relay 71 and one of the contacts 49 of current responsive device 46 and a conductor 80 which is connected between movable contact member 74 of relay 71 and the other contact 49 of current responsive device 46.

The general principles of operation of the embodiment of my invention diagrammatically shown in Fig. 2 may be best explained by considering the electric translating system when energy is being transmitted from the alternating current circuit 7 to the direct current load circuit 8 through the electric valve means 1. When the value of the current transmitted to the circuit 8 exceeds a predetermined value for which the current responsive device 46 has been adjusted, the current responsive device 46 will operate substantially instantaneously to cause movable contact members 47 and 48 to engage stationary contacts 49 and 49' respectively. The alternating current motor 17 will then be connected to phase conductors 43, 44 and 45 of the alternating current circuit 42 so that the cooling operation is initiated. So long as the current of the load circuit 8 exceeds the predetermined value, the current responsive device 46 will be maintained in the closed circuit position and the current responsive device 46 will open with a predetermined time delay after the current has decreased below the predetermined value, providing thereby an interval of cooling for the electric valve means 1 after the load current has decreased. So long as the temperature of the electric valve means 1 remains below a suitable value for which the thermostatic means 71 has been adjusted, the actuating coil 75' of the contactor 75 will be short circuited to prevent the closing of this contactor. However, if the temperature of the electric valve means 1 exceeds the predetermined value for which the thermostatic relay 71 has been adjusted, the movable contact member 74 will snap to the left-hand position to engage stationary contact 73 to provide a shunt path, including conductors 79 and 80, around stationary contacts 49 of the current responsive relay 46, and to remove the short circuit from the actuating coil 75' of contactor 75 to permit the contactor 75 to close. In this way, the alternating current motor 17 will be energized from the alternating current circuit 42 irrespective of the operation of the current responsive device 46 so long as the temperature of the electric valve means 1 remains above the predetermined value. When the temperature of the electric valve means 1 decreases, the movable contact member 74 will snap to the right-hand position, opening the shunt circuit around stationary contacts 49 and effecting short circuit of the actuating coil 75' of contactor 75 so that the motor 17 is deenergized.

Considering the system immediately after the closing of the current responsive device 46 in response to a load condition, it will be understood that the motor 17 will be energized, and if the system is operating normally the cooling air will be circulated about the electric valve means 1 and will exert a pressure on the vane 38 of the pressure responsive device 37 so that the movable contact member 39 is brought into engagement with the stationary contact 41. Immediately after the current responsive device 46 closes phase conductors 43 and 45, a timing operation is initiated by the energization of actuating coil 51 of time delay relay 50. By virtue of this timing operation, there is provided an interval of time to permit the motor 17 to accelerate to establish a pressure within the housing 15. During the period of the starting operation prior to the movement of the vane 38, the actuating coil 58 of the circuit controlling means 56 will be supplied direct current through a circuit including cathode 6 of electric valve means 1, conductor 55, thermostatic element 54, actuating coil 58, conductor 59, contacts 52 and 53 of time delay relay 50, conductor 60, and secondary winding 10 of transformer 9. If the fluid pressure does not attain a predetermined value within the interval of time established by the time delay relay 50, this circuit will be interrupted by movement of movable contact member 52 to effect disengagement of this member relative to the stationary contacts 53, so that the above described energizing circuit for the actuating coil 48 will be interrupted. In this way the load circuit 8 is controlled if the cooling system does not function properly. However, if the fluid pressure attains a predetermined value to effect movement of the vane 38 so that the movable contact member 39 of the pressure responsive device 37 engages stationary contact 41 prior to the opening of contacts 52 and 53, actuating coil 62 of relay 61 will be energized from the alternating current circuit 42 to provide a shunt path around the contacts of time delay relay 50, effecting continuous energization of the actuating coil 58 of the circuit controlling means 56. Prior to the movement of the vane 38, actuating coil 62 of relay 61 is short circuited through a circuit including conductors 68 and 69 and contacts 39 and 40 of the pressure responsive device 37. When the actuating coil 62 of relay 61 is energized, causing movable contact 63 to bridge stationary contacts 65, a shunt path is established around movable contact 39 and stationary contact 41 of the pressure responsive device 37 so that the effect of chattering, due to fluid pressure variations, is eliminated. In this manner, it will be understood that I provide an arrangement for controlling the load circuit 8 or for protecting the electric valve means 1 from excessively high temperatures in the event the cooling system fails to operate in a satisfactory manner. As an additional protective feature, the thermostatic relay 54 will operate to disconnect the load circuit 8 by the deenergization of coil 58 of the circuit controlling means 56 in the event the temperature of the electric valve means 1 exceeds a safe operating value.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an electric circuit, electric apparatus connected thereto, a cooling means for circulating a cooling fluid about said apparatus, means for initiating the operation of said first mentioned means in accordance with an electrical condition of said apparatus, and means for controlling said circuit in the event the pressure of said fluid does not attain a predetermined value within a predetermined time after the initiation of the operation of said cooling means.

2. In combination, a supply circuit, a load circuit, translating apparatus interposed between said circuits for transmitting energy therebetween, a cooling means for circulating a cooling fluid about said translating apparatus comprising a fan and an alternating current driving motor therefor, an alternating current circuit for energizing said motor, means responsive to an electrical condition of said load circuit for connecting said motor to said alternating current circuit, means for controlling said motor in accordance with the temperature of said translating apparatus, and means for disconnecting said load circuit in the event the pressure of said fluid does not attain a predetermined value within a predetermined interval of time after the initiation of the operation of said cooling means.

3. In combination, an electric circuit, electric translating apparatus connected to said circuit, cooling means for circulating a cooling fluid about said translating apparatus comprising a fan and a three phase alternating current driving motor therefor, a three phase alternating current circuit for energizing said motor and having one phase conductor permanently connected to said motor, means for energizing said motor in accordance with an electrical condition of said apparatus including a device for connecting the other two phase conductors of said three phase alternating current circuit to said motor, and means for controlling said motor in accordance with the temperature of said apparatus after the initiation of the operation of said motor by said device including a thermostatic element for completing the energization of said motor through said other two phase conductors so long as the temperature of said apparatus remains above a predetermined value and for effecting deenergization of said motor by disconnecting said other phase conductors of said alternating current circuit from said motor when the temperature of said apparatus is less than a predetermined value.

ELMO E. MOYER.